(12) United States Patent
Elsen

(10) Patent No.: US 8,832,052 B2
(45) Date of Patent: Sep. 9, 2014

(54) SEEDING SEARCH ENGINE CRAWLERS USING INTERCEPTED NETWORK TRAFFIC

(75) Inventor: Christian Elsen, Rolle (CH)

(73) Assignee: Cisco Technologies, Inc., San Jose, CA (US)

( * ) Notice: Subject to any disclaimer, the term of this patent is extended or adjusted under 35 U.S.C. 154(b) by 684 days.

(21) Appl. No.: 12/214,133

(22) Filed: Jun. 16, 2008

(65) Prior Publication Data

US 2009/0313241 A1 Dec. 17, 2009

(51) Int. Cl.
*G06F 17/30* (2006.01)
(52) U.S. Cl.
CPC .............................. *G06F 17/30864* (2013.01)
USPC ........................................ 707/705; 709/224
(58) Field of Classification Search
CPC ................................................ G06F 17/30864
USPC ............................ 707/705, 999.003; 709/224
See application file for complete search history.

(56) References Cited

U.S. PATENT DOCUMENTS

| | | | |
|---|---|---|---|
| 6,360,215 B1 * | 3/2002 | Judd et al. ............................... | 1/1 |
| 6,795,403 B1 * | 9/2004 | Gundavelli .................... | 370/256 |
| 7,028,039 B2 * | 4/2006 | Burrows et al. ................ | 707/709 |
| 7,392,482 B2 * | 6/2008 | Firebaugh et al. ............. | 715/734 |
| 7,398,271 B1 * | 7/2008 | Borkovsky et al. .................... | 1/1 |
| 7,502,994 B2 * | 3/2009 | Kocol ............................ | 715/205 |
| 7,885,204 B1 * | 2/2011 | Schongar et al. .............. | 370/254 |
| 8,065,292 B2 * | 11/2011 | Yu ................................. | 707/711 |
| 8,112,435 B2 * | 2/2012 | Epstein et al. ................. | 707/769 |
| 8,166,013 B2 * | 4/2012 | Bandaru et al. ................ | 707/705 |
| 8,392,366 B2 * | 3/2013 | Najork ........................... | 707/617 |
| 8,504,488 B2 * | 8/2013 | Dutta et al. ...................... | 706/12 |
| 2002/0065955 A1 * | 5/2002 | Gvily .............................. | 709/330 |
| 2002/0078201 A1 * | 6/2002 | Gvily .............................. | 709/225 |
| 2003/0217076 A1 * | 11/2003 | Heptinstall et al. ......... | 707/104.1 |
| 2004/0143669 A1 * | 7/2004 | Zhao et al. ..................... | 709/228 |
| 2004/0172389 A1 * | 9/2004 | Galai et al. ......................... | 707/3 |
| 2005/0120015 A1 * | 6/2005 | Marum Campos et al. ...... | 707/5 |
| 2005/0125807 A1 * | 6/2005 | Brady et al. ................... | 719/318 |
| 2005/0256956 A1 * | 11/2005 | Littlefield et al. ............. | 709/225 |
| 2006/0235858 A1 * | 10/2006 | Joshi et al. .................... | 707/100 |
| 2007/0112730 A1 * | 5/2007 | Gulli et al. ......................... | 707/3 |
| 2007/0244857 A1 * | 10/2007 | Yu ..................................... | 707/3 |
| 2007/0250480 A1 * | 10/2007 | Najork ............................... | 707/3 |
| 2007/0276816 A1 * | 11/2007 | Sample et al. .................... | 707/3 |
| 2007/0288473 A1 * | 12/2007 | Mukherjee et al. ............. | 707/10 |
| 2008/0021903 A1 * | 1/2008 | Singhal et al. .................. | 707/10 |
| 2008/0059507 A1 * | 3/2008 | Najork ........................... | 707/102 |
| 2008/0104226 A1 * | 5/2008 | Seshasai ........................ | 709/224 |

(Continued)

OTHER PUBLICATIONS

Bill Slawski, "Calculating Search Rankings with User Web Traffic Data", May 19, 2007, 8 pages, accessed online at <http://www.seobythesea.com/2007/05/calculating-search-rankings-with-user-web-traffic-data/> on Aug. 23, 2013.*

(Continued)

*Primary Examiner* — Phuong Thao Cao
(74) *Attorney, Agent, or Firm* — Baker Botts L.L.P.

(57) ABSTRACT

A method includes monitoring data packets exchanged in a computer network over which documents having respective location identifiers are distributed, so as to detect a request to access a given document. A location identifier of the given document is extracted from the request. The location identifier is provided to a search engine that searches for data in a set of the documents, so as to cause the search engine to add the given document to the set.

14 Claims, 2 Drawing Sheets

(56) References Cited

U.S. PATENT DOCUMENTS

| | | | |
|---|---|---|---|
| 2008/0209057 A1* | 8/2008 | Martini et al. | 709/229 |
| 2008/0222451 A1* | 9/2008 | Liu et al. | 714/25 |
| 2008/0228675 A1* | 9/2008 | Duffy et al. | 706/10 |
| 2008/0270237 A1* | 10/2008 | Epstein et al. | 705/14 |
| 2008/0270484 A1* | 10/2008 | Borkovsky et al. | 707/200 |
| 2008/0275844 A1* | 11/2008 | Buzsaki et al. | 707/3 |
| 2008/0276304 A1* | 11/2008 | Maffione et al. | 726/4 |
| 2009/0019019 A1* | 1/2009 | Jones et al. | 707/4 |
| 2009/0119268 A1* | 5/2009 | Bandaru et al. | 707/3 |
| 2009/0222438 A1* | 9/2009 | Strandell et al. | 707/5 |
| 2009/0248656 A1* | 10/2009 | Blinnikka | 707/5 |
| 2009/0276377 A1* | 11/2009 | Dutta et al. | 706/12 |
| 2011/0093533 A1* | 4/2011 | Kataria et al. | 709/203 |

OTHER PUBLICATIONS

Brandman et al., "Crawler-Friendly Web Serves", In Proceedings of the Workshop on Performance and Architecture of Web Servers (PAWS), Santa Clara, California, USA, Jun. 2000, 16 pages.*

X. Yuan, et al., "An efficient scheme to remove crawler traffic from the internet", 2002.

\* cited by examiner

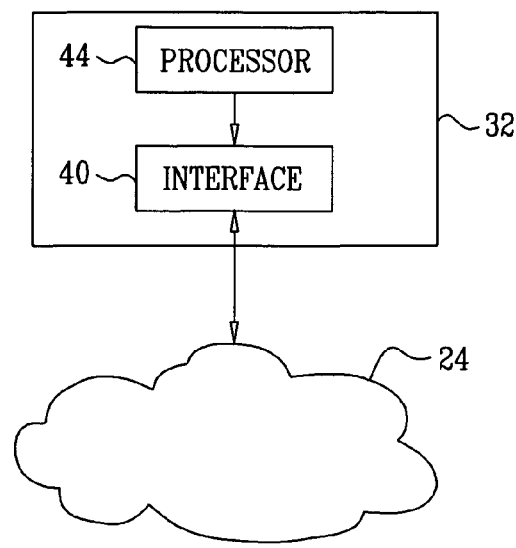
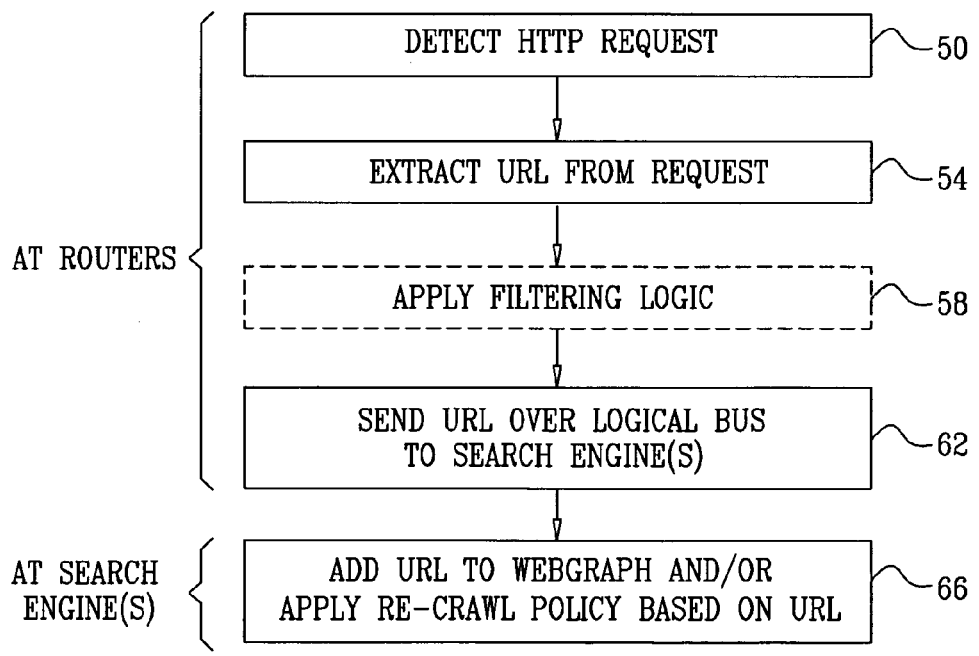

SEEDING SEARCH ENGINE CRAWLERS USING INTERCEPTED NETWORK TRAFFIC

FIELD OF THE INVENTION

The present invention relates generally to computer networks, and particularly to methods and systems for searching for data in computer networks.

BACKGROUND OF THE INVENTION

Various kinds of search engines are deployed extensively in computer networks. For example, some search engines gradually map the network by following links that point from one data page to another in order to traverse the network, and index the data stored therein. Such search engines are often referred to as "web-crawling" engines. A web-crawling search engine typically maintains a data structure, known as a web-graph, which represents the link relationships in the set of traversed pages.

The present invention will be more fully understood from the following detailed description of the embodiments thereof, taken together with the drawings in which:

BRIEF DESCRIPTION OF THE DRAWINGS

FIG. 2 is a block diagram that schematically illustrates a network router, in accordance with an embodiment of the present invention; and FIG. 3 is a flow chart that schematically illustrates a method for seeding a web-crawling search engine, in accordance with an embodiment of the present invention.

DETAILED DESCRIPTION OF EXAMPLE EMBODIMENTS

Overview

Figure 1:
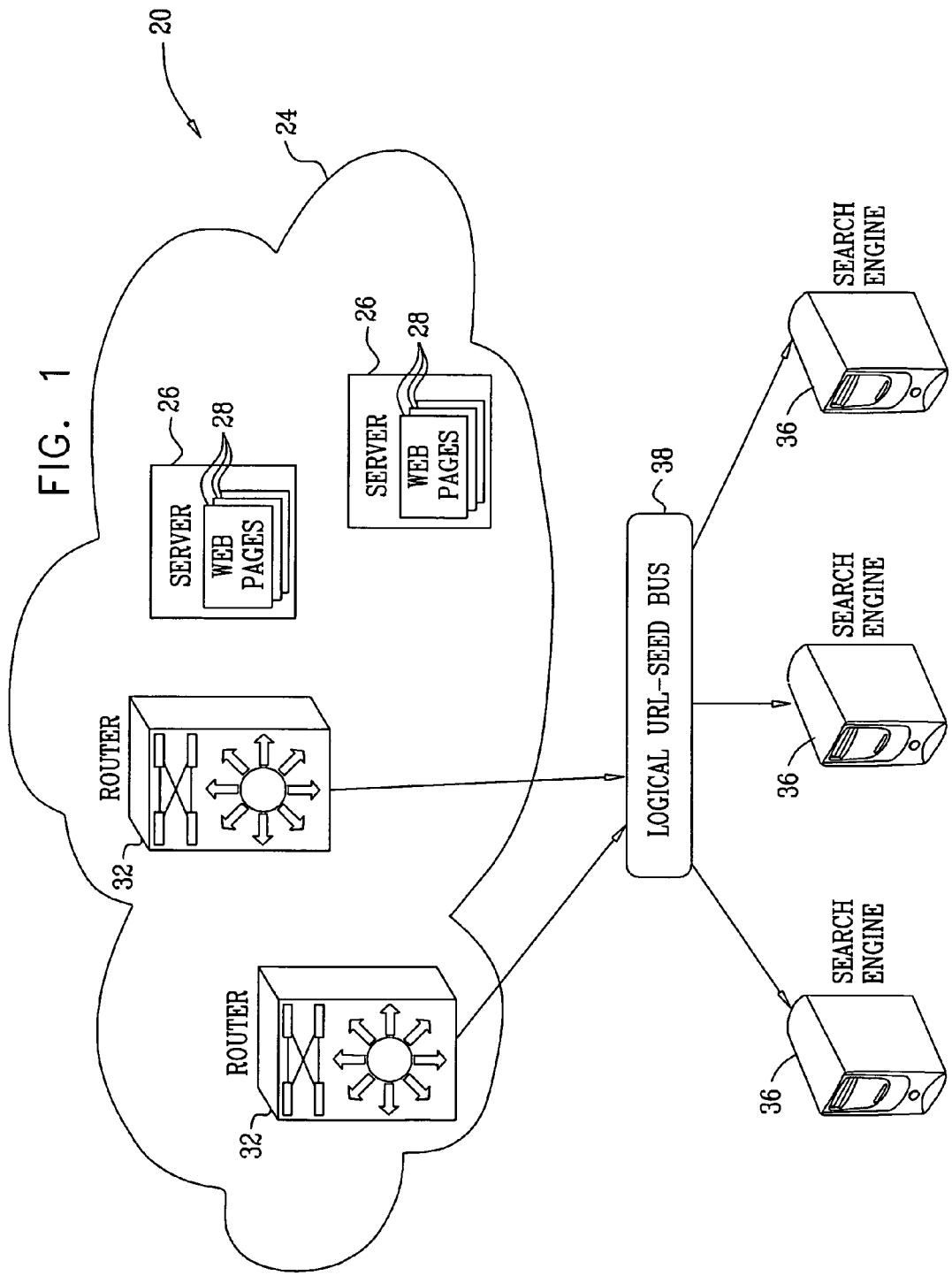
FIG. 1 is a block diagram that schematically illustrates a system for searching for data in a computer network, in accordance with an embodiment of the present invention.

A web-crawling search engine typically begins traversing a searched computer network with a web-graph, which begins from a set of "seed" pages that are provided a priori. The search engine follows links in the seed pages that point to other pages, adds the linked pages to its web-graph, and continues to expand the web-graph by following links in the newly-added pages.

As can be appreciated, such a search engine can index and search only pages that belong to its web-graph. Pages that are not linked to the seed pages, directly or indirectly, will not be reached at all using conventional web-crawling processes. Other pages, which are linked to the seed pages, may not exist in the web-graph at a given point in time because the crawling process has not reached them yet. Regardless of the reason for not belonging to the web-graph, pages that do not exist in the web-graph may hold important information that might be missed by the search engine, either temporarily or permanently.

Embodiments of the present invention that are described hereinbelow provide improved methods and systems for supplying seed pages to web-crawling search engines. The methods and systems described herein identify pages that are accessed by network users and report the identified pages to the search engine, so as to cause the search engine to update its web-graph with these pages. Using the disclosed techniques, web-crawling search engines are able to reach pages that are not linked to the initial seed pages.

The methods and systems described herein are typically deployed in network elements that process data packets in the computer network, such as in routers, multilayer switches or any other suitable device. In a typical implementation, a network element monitors data packets that are exchanged in the computer network. The network element detects a request to access a given document, e.g., a Hyper-Text Transfer Protocol (HTTP) request to access a certain Web page. The network element extracts a location identifier of the given document (e.g., a Uniform Resource Locator—URL) from the request. The network element sends the extracted identifier to the search engine, so as to cause the search engine to add the given document to the web-graph.

In some embodiments, the network element filters or otherwise pre-processes the extracted identifiers before sending them to the search engine. In other embodiments, all extracted identifiers are sent to the search engine without filtering. In either case, the search engine typically chooses whether or not to add the reported identifiers to its web-graph.

In some embodiments, the reported identifiers are used by the search engine in determining when to revisit ("re-crawl") a certain document that already exists in the web-graph. For example, if the search engine receives frequent reports on a given document, it may assume that the content of the document may have changed, and thus decide to revisit it in order to capture the potentially-new content. In some embodiments, one or more network elements capture and report identifiers to one or more search engines using a reporting protocol, referred to as a logical bus.

Thus, the methods and systems described herein considerably improve the performance of web-crawling search engines. In some embodiments, the methods and systems described herein can be deployed with little or no modification to the search engine. Moreover, the methods and systems described herein may be implemented with little or no modification of network element hardware.

System Description

FIG. 1 is a block diagram that schematically illustrates a system 20 for searching in a computer network 24, in accordance with an embodiment of the present invention. Network 24 may comprise, for example, a Wide-Area Network (WAN) such as the Internet, a Metropolitan-Area Network (MAN), a Local-Area Network (LAN) or a combination of such network types. Network 24 may comprise a public network or an enterprise network (sometimes referred to as an Intranet). Additionally or alternatively, network 24 may comprise any other suitable network type. The network typically comprises a packet-switched network, such as an Internet Protocol (IP) network.

Network 24 comprises servers 26, which store data in Web pages 28. Each page is assigned a unique location identifier, such as a Uniform Resource Locator (URL). In some embodiments, the servers host Web pages that are produced a-priori. In alternative embodiments, the servers generate Web pages directly based on user input. The methods and systems described herein can be used in any suitable network over which documents are distributed, regardless of whether the documents are stored a-priori or generated on-demand. Although the exemplary embodiment of FIG. 1 refers to servers, the methods and systems described herein can be used with any other sort of storage or computing devices known in the art. Moreover, although the embodiments described herein refer to Web pages, the disclosed methods and systems can be used with any other suitable type of document. In the context of the present patent application and in the claims, the term "document" refers to any kind of data resource having a location identifier, such as, for example, a file, a Web page, a database record, a web service or another generic computing service.

Network 24 comprises network elements, such as routers 32, which perform routing or forwarding of data packets in the network. Although the description that follows refers to network routers, the methods and systems described herein can be used with various other kinds of network elements that process data packets, such as switches or gateways.

System 20 comprises one or more search engines 36, which search for data in network 24 in response to user queries. Search engines 36 use web-crawling techniques, as are known in the art. For example, search engine 36 may comprise a Google™ search engine, which is provided by Google, Inc., (Mountain View, Calif.), or the open-source Nutch search engine provides by the Apache Software Foundation. Search engines 36 may comprise different instances of a certain search engine (e.g., multiple Google Appliance boxes) and/or search engines of different types.

Each search engine 36 maintains a web-graph or equivalent data structure, which represents a set of pages that are currently known to the search engine and the links between them. The search engine searches for data in the set of pages, typically by (1) producing an index that maps words to the pages in which they appear, and (2) querying the index in response to user queries.

The search engine creates the web-graph in a progressive manner. The search engine is initially provided with a set of pages, e.g., a set of popular Web pages, which are referred to as a seed. The search engine "crawls" the Web by following links that appear in the seed pages and adding the linked pages to the web-graph. When a page is added to the web-graph, the search engine updates the index with the words that are found in this page. The crawling process continues in a progressive manner by following the links in the newly-added pages, so that the web-graph is expanded constantly. Since page content may change over time, the search engine typically performs re-crawling, i.e., revisits pages that already exist in the web-graph, in accordance with a certain re-crawling policy.

As can be appreciated, search engine 36 can index and search only pages that belong to its web-graph. Pages that do not exist in the web-graph will not be indexed and the data in these pages cannot be retrieved.

Embodiments of the present invention provide improved methods and systems for adding pages to the web-graphs of search engines 36. As will be described in detail further below, routers 32 (or other network elements in network 24) monitor data packets exchanged in the network, in order to detect requests from users to access Web pages 28. When a router detects a request to access a certain page, it extracts an identifier of the requested page from the request, and forwards the identifier to the search engines. The search engines may choose to add the reported pages to their web-graphs. Thus, pages that are not linked to the seed pages, but are requested by users, can be reached, indexed and searched by the search engines.

In some embodiments, the routers send the identifiers to the search engines using a logical bus 38. Bus 38 comprises a communication protocol that is supported by the network elements and the search engines. In some embodiments, the logical bus may be implemented using known mechanisms and protocols, such as using multicast packet transmission.

FIG. 2 is a block diagram that schematically illustrates router 32, in accordance with an embodiment of the present invention. Router 32 in the present example comprises a network interface 40 for communicating with network 24, and a processor 44 that carries out the methods described herein.

Processor 44 may be implemented using hardware components, using software, or using a combination of hardware and software elements. In some embodiments, the functions of detecting requests, extracting identifiers and sending them to the search engines are carried out by the same processor or group of processors that perform conventional routing functions of router 32. Alternatively, request detection, identifier extraction and sending can be implemented using a separate, dedicated processor. Typically, the processor comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

Seeding Search Engine Crawler Using Intercepted Network Traffic

FIG. 3 is a flow chart that schematically illustrates a method for seeding search engine 36, in accordance with an embodiment of the present invention. The example of FIG. 3 refers to a search engine that searches Web pages on the Internet, and to routers or multilayer switches that identify Hyper-Text transfer Protocol (HTTP) requests that indicate Uniform Resource Locators (URL) of requested Web pages. In alternative embodiments, the method of FIG. 3 can be used with search engines that search other types of networks and/or other types of documents. The detected requests may comprise any other suitable type of request. The extracted identifier may comprise not only a URL, but also any other suitable type of identifier, that is a Uniform Resource Identifier (URI).

Various techniques for detecting requests and for extracting URLs from requests are known in the art, and any suitable method can be used. Such techniques are used, for example, in Network Intrusion Detection Systems (NIDS). Some of these processes can be implemented at wire-speed, even for high-speed networks such as 10-Gigabit Ethernet networks, using suitable Application-Specific Integrated Circuits (ASICs) or Field-Programmable Gate Arrays (FPGAs). One exemplary process that can be used for detecting requests is commonly known as Deep Packet Inspection (DPI). A typical DPI process examines the data and/or header of a packet as it passes a certain inspection point. A DPI process can search for predefined criteria, such as for a HTTP request, and pass the corresponding packet to another process for extraction of the request URL.

Various methods and systems for implementing Deep Packet Inspection points within IP network nodes are known in the art. In some implementations, DPI functionality can be integrated into a network node. For example, Cisco Systems, Inc. (San Jose, Calif.) offers a series of network switches called Catalyst 6500. DPI functionality can be integrated into such switches using a component called Cisco Catalyst 6500 Supervisor Engine 32 Programmable Intelligent Services Accelerator (PISA). In alternative implementations, DPI functionality can be carried out by a standalone component, e.g., by a device that is introduced into the traffic path between two network nodes or by mirroring the inbound or outbound traffic of a network node to such a device. A standalone device that implements DPI may comprise, for example, an SCE 2000 Series Service Control Engine, offered by Cisco Systems, Inc. Thus, the methods described herein can be carried out by one or more network elements, which may or may not be physically collocated. The processors of these network elements are collectively regarded herein as a processor that carries out the disclosed methods.

The method of FIG. 3 begins with router 32 detecting an HTTP request, at a request detection step 50. The detected HTTP request is typically sent from a user of network 24, requesting to access a certain Web page 28 that is stored in the network. The HTTP request comprises a URL of the requested page. The router extracts the URL from the request, at an identifier extraction step 54.

In some embodiments, router 32 may apply filtering to the extracted URLs, at a filtering step 58. In other words, the router may evaluate a certain condition with respect to the extracted URL, and send the URL to the search engine only when the condition is met. The condition may depend on the time that elapsed between the detection of the request and the detection of a previous request to access the same page (i.e., a previous request carrying the same URL). For example, the router may send a given URL to the search engine only if the page was not previously requested within a predefined time interval. This technique avoids sending duplicate reports of the same URL, and may assist in reducing the amount of traffic between the routers and search engine. In alternative embodiments, all extracted URLs are sent to the search engine without filtering.

Additionally or alternatively to filtering multiple requests of the same URL, the router may count the number of occurrences and report this number to the search engine. For example, the router may accumulate requests that carry a given URL over a certain period of time, and send a cumulative report to the search engine. The cumulative report indicates the URL in question, and the number of detected requests that carry this URL. As noted above, the router sends the URL to the search engine using logical bus 38, at a URL reporting step 62.

Search engine 36 may update its web-graph (i.e., to the set of searched pages) in response to the URL sent by router 32, at a web-graph updating step 66. In some embodiments, the search engine adds the page indicated by the URL to the web-graph, assuming the page does not already exist in the web-graph. From this stage, the crawling process will follow links that appear in the newly-added page. Thus, the newly-added page forms an additional seed page of the web-graph. The crawling process will eventually add the pages linked to the newly-added page to the web-graph, so that these pages are reachable to the search engine. Such pages may have been impossible to reach before the URL was reported, for example if the newly-added page was not linked to the pages of the web-graph in any way.

In some embodiments, the search engine decides if and when to revisit a page that already exists in the web-graph based on the reported URLs. For example, if the search engine identifies that a certain page is reported frequently, the search engine may conclude that the content of this page may have changed. The search engine may decide to revisit ("re-crawl") this page, and update the index to reflect the new content. Generally speaking, the search engine may decide to search pages that already exist in its web-graph in response to the reported URLs, irrespective of whether these pages have already been searched before. Additionally or alternatively, the search engine may apply any other suitable re-crawling policy in response to the reported URLs.

Generally speaking, the specific actions taken by the search engine are determined independently of the routers. In particular, each search engine may decide whether to add or revisit a page upon receiving a URL from the routers. Typically, the routers have no information as to whether or not a given page exists in the web-graph of a certain search engine.

Note that a given search engine may update its web-graph with respect to a given page (e.g., add the page to the web-graph or decide to re-crawl the page) in response to reports sent from the same router or from different routers. Different search engines may exercise different policies and may produce different web-graphs based on the same URL reports from the routers.

Although the embodiments described herein mainly address seeding of web-crawling search engines, the principles of the present invention can also be used for additional applications, such as for controlling the re-crawl frequency for a given Web page.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for providing a seed Uniform Resource Locator (URL) of a document within a computer network to a search engine in the computer network, the computer network having a plurality of documents with URLs distributed therein, the search engine having a web-graph in which exists a set of crawled documents, the method comprising:

detecting, by a router, from among data packets exchanged in the computer network external to the search engine, a packet containing a request to access a requested document, the router not being aware of which documents are not reachable by the search engine;

extracting a requested document URL of the requested document from the packet containing the request; and determining that the requested document URL was not previously requested within a predetermined time interval, and in response, providing the requested document URL as the seed URL to the search engine, so as to cause the search engine to expand the set of crawled documents by adding the requested document to the set of crawled documents.

2. The method according to claim 1, and comprising, after the requested document is added to the set of crawled documents, applying the search engine to search in the set of crawled documents including the requested document.

3. The method according to claim 1, wherein providing the seed URL comprises evaluating a condition related to the requested document URL, and providing the requested document URL only responsively to meeting the condition.

4. The method according to claim 1, wherein the documents comprise Web pages.

5. The method according to claim 1, wherein the request comprises a Hyper-Text Transfer Protocol (HTTP) request.

6. The method of claim 1, wherein the requested document URL is provided as the seed URL to the search engine using a logical bus.

7. The method of claim 1, wherein providing the requested document URL comprises filtering the extracted requested document URL and providing the requested document URL as the seed URL to the search engine only if a condition of the filtering is met.

8. The method of claim 7, wherein the condition is based on the time that has elapsed between the detection of the request and the detection of a previous request to access the same requested document.

9. The method of claim 1, and further comprising providing to the search engine a number of requests of a same URL over a period of time.

10. A system for providing a seed Uniform Resource Locator (URL) of a document within a computer network to a search engine in the computer network, the computer network having a plurality of documents with URLs distributed therein, the search engine having a web-graph in which exists a set of crawled documents, the system comprising:
- a network interface for communicating with the computer network; and
- a hardware processor coupled to the network interface, the hardware processor configured to execute software stored in a non-transitory computer-readable medium to:
  - detect, from among data packets exchanged in the computer network external to the search engine, a packet containing a request to access a requested document;
  - extract a requested document URL of the requested document from the packet containing the request; and
  - determine that the requested document URL was not previously requested within a predetermined time interval, and in response, provide the requested document URL as the seed URL to the search engine so as to cause the search engine to expand the set of crawled documents by adding the requested document to the set of crawled documents; and
- wherein the hardware processor is not aware of which documents are not reachable by the search engine.

11. The system according to claim 10, wherein the hardware processor is configured to evaluate a condition related to the requested document URL, and to provide the requested document URL only responsively to meeting the condition.

12. The system according to claim 10, wherein the documents comprise Web pages.

13. The system according to claim 10, wherein the request comprises a Hyper-Text Transfer Protocol (HTTP) request.

14. A system for providing a seed Uniform Resource Locator (URL) of a document within a computer network, the computer network having a plurality of documents with URLs distributed therein, the system comprising:
- a search engine having a web-graph in which exists a set of crawled documents;
- a network element hardware device external to the search engine, which includes a processor and is configured to monitor data packets exchanged in a computer network external to the search engine, to detect a packet containing a request to access a requested document, to extract a requested document URL of the requested document from the packet containing the request, and to determine that the requested document URL was not previously requested within a predetermined amount of time, and in response, send the extracted location identifier URL as the seed URL to the search engine so as to cause the search engine to expand the set of crawled documents by adding the requested document to the set of crawled documents, wherein the network element hardware device is not aware of which documents are not reachable by the search engine.

\* \* \* \* \*